United States Patent
Prosser et al.

(10) Patent No.: US 6,971,474 B2
(45) Date of Patent: Dec. 6, 2005

(54) AIR GUIDING ELEMENT, ESPECIALLY AN AIR GUIDING CHANNEL FOR A MOTOR VEHICLE

(75) Inventors: Werner Prosser, Feldkirch (AT); Horst Lederer, Weiler (AT)

(73) Assignee: Carcoustics Tech Center GmbH, Leverkusen (DE)

( * ) Notice: Subject to any disclaimer, the term of this patent is extended or adjusted under 35 U.S.C. 154(b) by 0 days.

(21) Appl. No.: 10/500,255

(22) PCT Filed: Oct. 28, 2003

(86) PCT No.: PCT/EP03/11947

§ 371 (c)(1),
(2), (4) Date: Jun. 25, 2004

(87) PCT Pub. No.: WO2004/058524

PCT Pub. Date: Jul. 15, 2004

(65) Prior Publication Data

US 2005/0020200 A1   Jan. 27, 2005

(30) Foreign Application Priority Data

Dec. 20, 2002   (DE) ............................... 102 61 081

(51) Int. Cl.⁷ ................................................ B60H 1/00

(52) U.S. Cl. ..................... 181/198; 181/224; 454/906

(58) Field of Search ............................... 181/198, 290, 181/291, 284, 224, 225; 454/906

(56) References Cited

U.S. PATENT DOCUMENTS

| | | | | |
|---|---|---|---|---|
| 3,059,564 A | * | 10/1962 | Curran et al. | 454/262 |
| 5,821,473 A | * | 10/1998 | Takahashi | 181/224 |
| 6,178,764 B1 | | 1/2001 | Tanaka et al. | |
| 2002/0084138 A1 | * | 7/2002 | Weinstein | 181/268 |
| 2003/0159880 A1 | * | 8/2003 | Blomeling et al. | 181/204 |
| 2004/0231915 A1 | * | 11/2004 | Thompson et al. | 181/290 |

FOREIGN PATENT DOCUMENTS

| | | | |
|---|---|---|---|
| DE | 3639138 | 5/1988 | |
| DE | 9100514 | 5/1992 | |
| FR | 2745034 | 8/1997 | |
| JP | 52054255 A * | 5/1977 | ............ F24F 7/04 |
| JP | 04194205 A * | 7/1992 | ............ E01F 8/00 |
| JP | 06156051 A * | 6/1994 | ............ B60H 1/00 |
| JP | 6156052 | 6/1994 | |
| JP | 6156054 | 6/1994 | |

\* cited by examiner

Primary Examiner—Harold Joyce
(74) Attorney, Agent, or Firm—Collard & Roe, P.C.

(57) ABSTRACT

An air conduction element (1), particularly an air conduction channel for a motor vehicle, having a reverberant channel body (2) manufactured from plastic, which has at least one wall region replaced by a sound-absorbing component (10, 11), the sound-absorbing component having an at least partially exposed outer side. An edge region of the sound-absorbing component (10, 11) be extrusion-coated with the plastic of the channel body (2) in such a way that the sound-absorbing component (10, 11) is connected in a form-fitting way to the channel body (2) along at least a section of its circumference.

12 Claims, 3 Drawing Sheets

AIR GUIDING ELEMENT, ESPECIALLY AN AIR GUIDING CHANNEL FOR A MOTOR VEHICLE

CROSS REFERENCE TO RELATED APPLICATIONS

Applicants claim priority under 35 U.S.C. §119 of German Application No. 102 61 081.9 filed on Dec. 20, 2002. Applicants also claim priority under 35 U.S.C. §365 of PCT/EP03/011947 filed on Oct. 28, 2003. The international application under PCT article 21(2) was not published in English.

The present invention relates to an air conduction element, particularly an air conduction channel for a motor vehicle, having a reverberant channel body manufactured from plastic, which has at least one wall region replaced by a sound-absorbing component, the sound-absorbing component having an at least partially exposed outer side.

An air conduction element of this type is known from DE 91 00 514 U1. The known air conduction element includes a channel body which is manufactured as an injection molded part from reverberant plastic, e.g., polypropylene. A window-like opening is left open in the wall of the dimensionally stable channel body. This opening is covered with an insulating part, which has both a sound insulating and a sound damping effect. The insulating part is made of melamine resin foam, which is internally and externally enclosed by a textile nonwoven. The support of the insulating part on the channel body is implemented in such a way that a lower edge of the insulating part is inserted into a clamp support and at least an upper edge of the insulating part is riveted, clipped, or screwed to the channel body. The edge and the clamp support are implemented like a tongue and groove receiver, the insulating part being held clamped along the lower edge via an insertion strip on the channel body. Clips, screw connections, or rivets may also be provided on the lateral edge regions and/or edges of the insulating part. Manufacturing this air conduction element is relatively time-consuming and costly, particularly because of the clamp support, which includes the insertion strip.

Furthermore, air conduction elements according to the species, in which the sound-absorbing component is glued to the edge of the window-like opening or recess of the channel body using an adhesive, are known. Air conduction elements of this type are described, for example, in Japanese patent applications JP 6156052 and JP 6156054. In order to ensure a reliable adhesive bond, it is typically necessary to subject the adhesive areas to a suitable surface treatment beforehand. If the channel body is made of polypropylene and the sound-absorbing component is made of polyethylene terephthalate, for example, a plasma treatment of the adhesive areas is typically performed beforehand in order to ensure reliable adhesion of the pieces to the channel body and the sound-absorbing component. These air conduction elements are also relatively costly to manufacture because of the use of adhesive and the possibly necessary surface treatment of the adhesive areas.

The object of the present invention is to modify an air conduction element of the type cited at the beginning in such a way that it may be manufactured more cost-effectively with the same or even improved acoustic effect.

This object is essentially achieved according to the present invention in that an edge region of the sound-absorbing component is extrusion-coated with the plastic of the channel body in such a way that the sound-absorbing component is connected to the channel body in a form-fitting way along at least part of its circumference. The sound-absorbing component is therefore held in the channel body like a frame.

The air conduction element according to the present invention requires the use of neither an insertion strip nor clips, screw connections, or rivets, nor the use of adhesive, nor a surface treatment in the form of a plasma treatment for the support of the sound-absorbing component. The manufacture of the air conduction element according to the present invention therefore requires fewer work steps than typical air conduction elements according to the species. In addition, the manufacture of air conduction elements according to the present invention may be automated more easily than is the case for the above-mentioned known air conduction elements. The present invention therefore allows a significantly more rapid, controlled, and cost-effective manufacture of air conduction elements according to the species.

In particular, now even relatively small and complexly shaped openings of air conduction elements according to the species may be provided with sound-absorbing wall sections cost-effectively.

An advantageous embodiment of the air conduction element according to the present invention is distinguished in that the sound-absorbing component is connected to the channel body in a form-fitting way along its entire circumference. In this way, a peripheral seal may be achieved on the edge of the sound-absorbing component. If unacceptably high air and/or pressure losses arise at the sound-absorbing component because of its construction from an air-permeable absorber layer, this may be avoided according to a further embodiment of the present invention, if necessary, by providing the sound-absorbing component on the outside with a film which is impermeable to air or with a microperforated film which is largely impermeable to air.

A further preferred embodiment of the present invention is that the channel body of the air conduction element is implemented as a one-piece hollow body. This means that the channel body is not assembled from multiple parts, such as from two halves, but rather is manufactured as a one-piece hollow body in the injection molding method. In this way, the work steps in the manufacture of the air conduction element are reduced further. It is obvious, however, that it is also possible to assemble the channel body from multiple parts, particularly from two halves.

The sound-absorbing component may preferably have an air-permeable layer made of polyethylene terephthalate (PET). This layer may additionally be coated on one or both sides with a nonwoven. In principle, however, the sound-absorbing component may be made not only from PET, but rather also from other suitable sound-absorbing materials and/or composite materials.

Both the channel body and the sound-absorbing component and possibly a film positioned on the outer side of the sound-absorbing component may be made of polyethylene terephthalate (PET). In this way, type-pure recycling of the air conduction element is made possible and/or easier.

Further preferred and advantageous embodiments of the present invention are specified in the subclaims.

In the following, the present invention will be described in greater detail on the basis of a drawing, which illustrates multiple exemplary embodiments.

Figure 1:
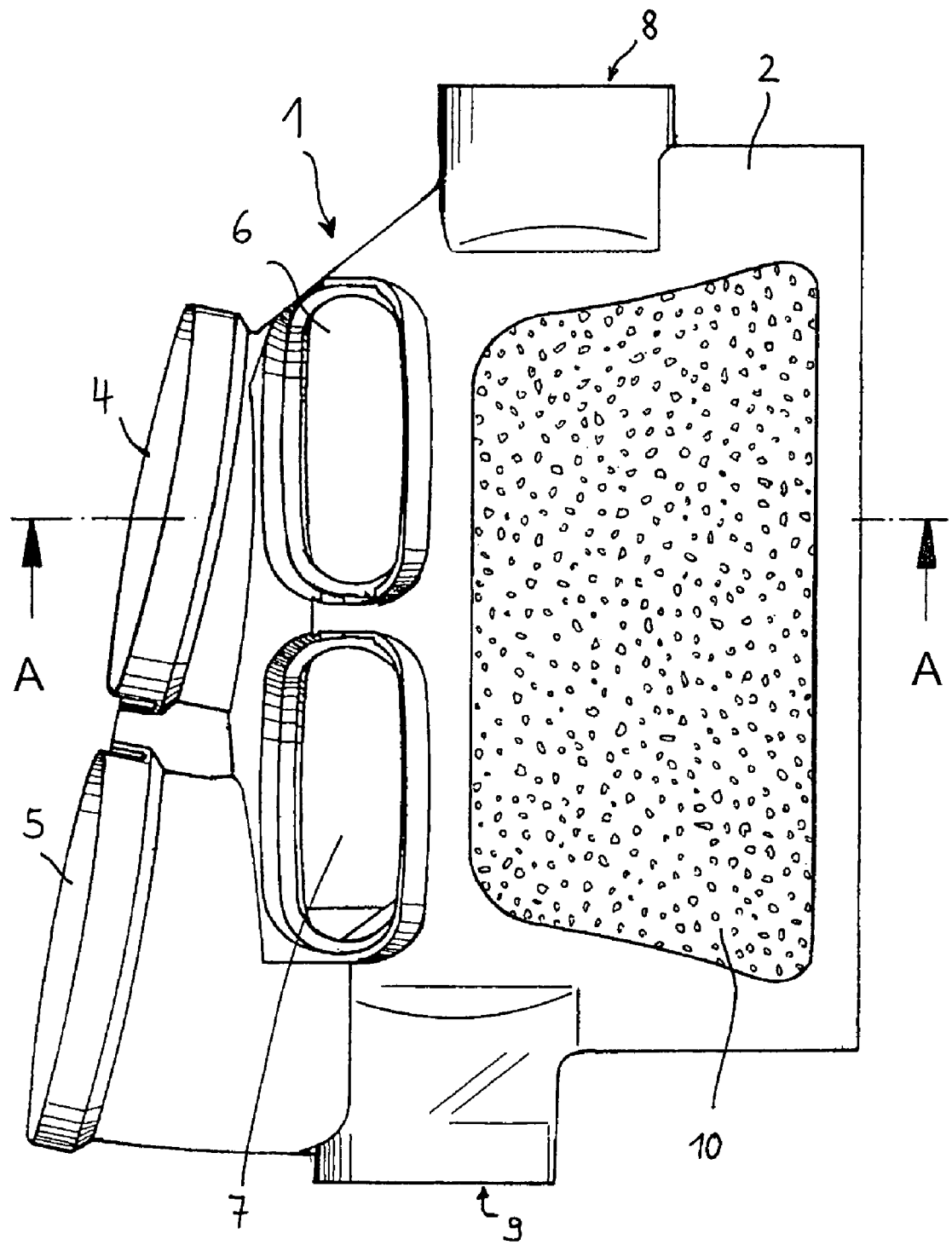
FIG. 1 shows a top view of an air conduction element in the form of a ventilation channel which has multiple branches.

The air conduction element 1 illustrated in the drawing is intended for installation in a motor vehicle. The air conduction element 1 includes a reverberant channel body 2, manufactured from plastic, which is used here for air distribution to multiple air outlet nozzles (not shown). In the installed state, air is supplied via the connection opening 3 and distributed to the air outlet nozzles via the branch openings 4, 5, 6, 7, 8, and 9.

Ventilation noises, which are frequently found to be disturbing by the vehicle occupants, arise during the generation of an air flow by a ventilator in the motor vehicle and during the conduction and/or redirection of the air flow. Engine noises may also be transmitted into the inside of the vehicle via the air conduction system, which is produced from channels and/or hoses.

Figure 2:
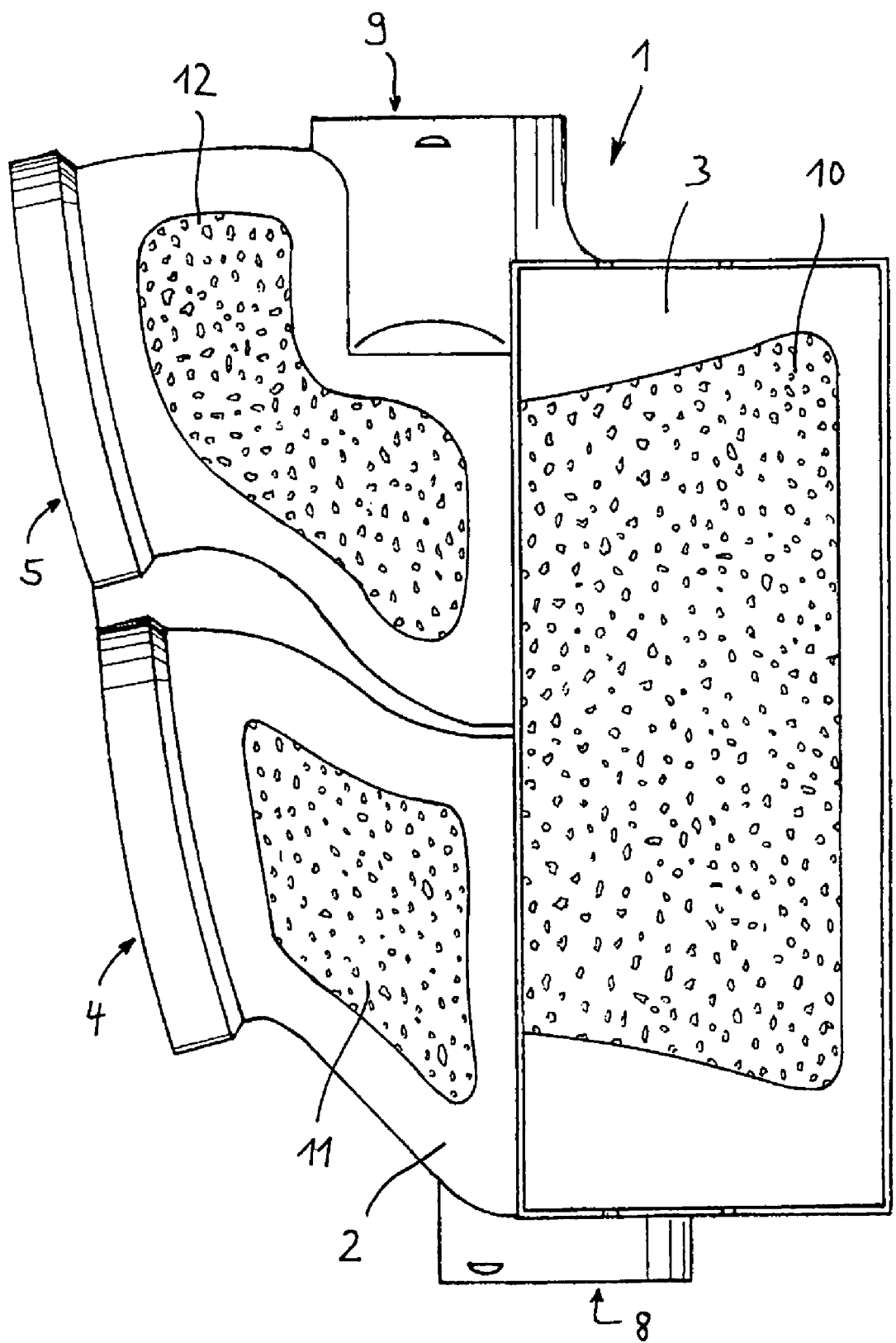
FIG. 2 shows a bottom view of the air conduction element shown in FIG. 1.

In order to damp and/or reduce such ventilation and engine noises, at least one wall region of the reverberant channel body 2 is replaced by a sound-absorbing component 10, 11, and/or 12. In the exemplary embodiment shown, a wall region on the outer curve is replaced over the curve length B by a sound-absorbing component 10. In addition, two further sound-absorbing components 11 and 12 may be positioned on the wall region of the channel body 2 on the inner curve, near the branch openings 4 to 9 (cf. FIGS. 2 and 3).

The channel body 2 is an injection molded part which is manufactured from polypropylene, polyethylene terephthalate (PET) or another suitable thermoplastic in the "one-shot method". The channel body 2 is preferably implemented as a one-piece injection molded part. However, embodiments of the channel body which may be produced more advantageously from multiple parts are also possible. In such cases, the parts and/or halves may be connected to one another by welding and/or heat sealing or through clamps, clips, or the like.

The sound-absorbing components 10, 11, 12 are inserted as an acoustically active material into an injection molding tool (not shown). This may preferably be performed automatically using a robot or the like. The injection molding tool (injection mold) is implemented in such a way that the sound-absorbing components 10, 11, 12 are each extrusion coated on their edge in such a way that the particular sound-absorbing component is connected to the channel body 2 in a form-fitting way along at least a section of its circumference. However, an embodiment in which the particular sound-absorbing component 10, 11, and/or 12 is connected in a form-fitting way to the channel body 2 along its entire circumference is preferred.

The sound-absorbing component 10, 11, and/or 12 is largely exposed both on its inner side and on its outer side. Only its edge is extrusion-coated. The channel body 2 thus forms a kind of frame for the particular sound-absorbing component 10, 11, and/or 12. In order to achieve this, a special tool technology is necessary, in which the sound-absorbing components 10, 11, 12 are clamped between two or more tool parts in such a way that the thermoplastic injection molding compound extrusion coats the edge of the particular sound-absorbing component, but does not cover the inner side and outer side of the sound-absorbing component. Thus, a window-like opening arises in the channel body 2, which is closed by the sound-absorbing component 10, 11, and/or 12. As may be seen in FIG. 3, the edge of the particular sound-absorbing component is therefore held in a peripheral groove and/or enclosed by peripheral webs 13, 14.

The sound-absorbing components 10, 11, 12 themselves may be made of different sound-absorbing materials. For example, a porous, air-permeable foam layer and/or nonwoven layer may be used. In particular, a preferred embodiment is to use an air-permeable layer 15 made of polyethylene terephthalate for the sound-absorbing component 10, 11, and/or 12.

Furthermore, sandwich structures are also advantageous. Thus, in the exemplary embodiment shown here, the air-permeable layer 15 of the sound-absorbing component is provided with a carrier nonwoven 16 and a cover nonwoven 17.

Figure 3:
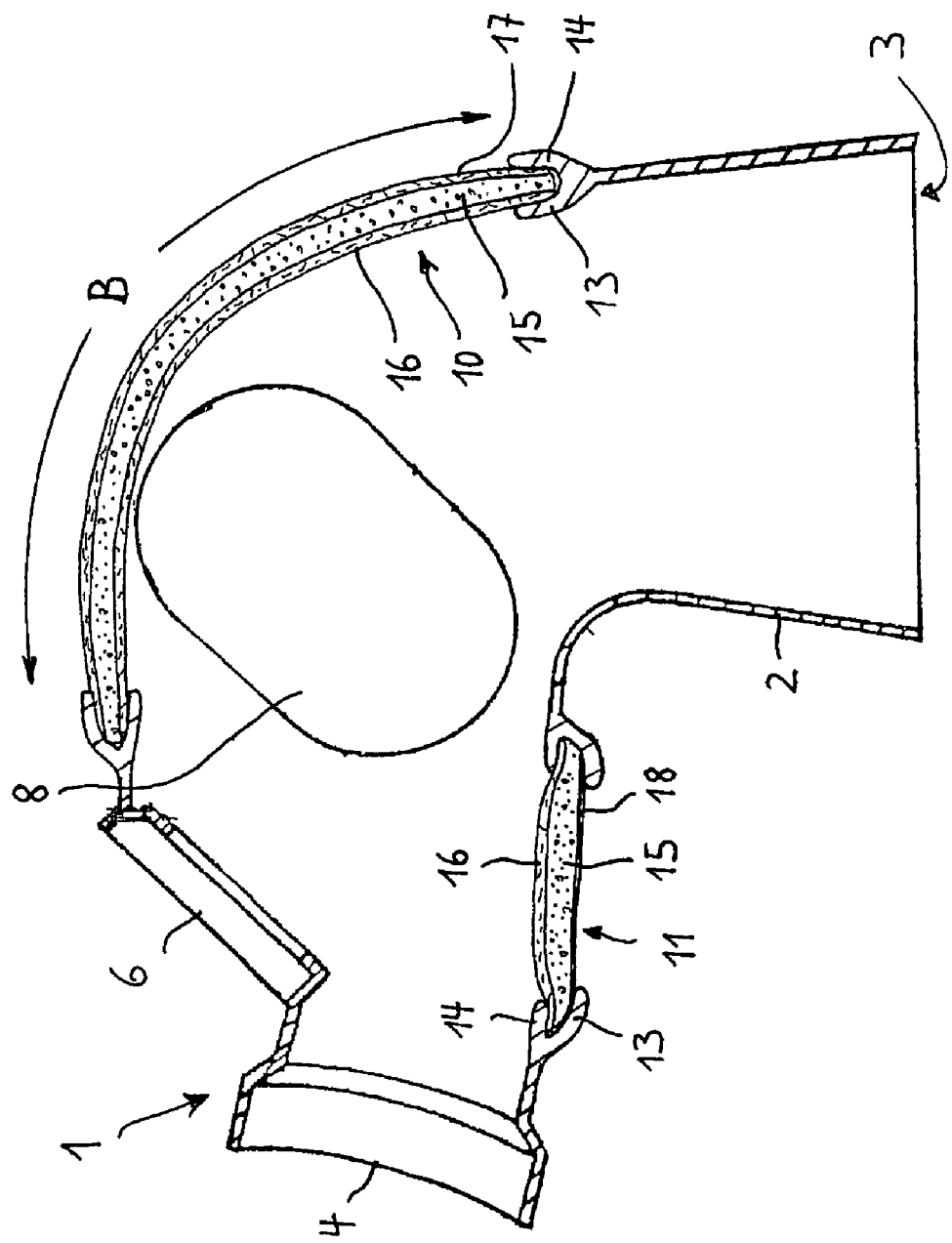
FIG. 3 shows a sectional view of the air conduction element shown in FIG. 1, in section along the line A—A.

The external nonwoven 17 may additionally be covered with a film which is impermeable to air to prevent possible air losses via the sound-absorbing component. In FIG. 3, the sound-absorbing component 11 includes an air-permeable layer 15, which is laminated internally with a nonwoven 16 and externally with a film 18 which is impermeable to air.

Under certain circumstances, it may also be advantageous if a microperforated film (not shown) is positioned on the outer side of the air-permeable layer 15 or on the outer side of the nonwoven 17.

The sound-absorbing component 10 positioned in the wall region of the channel body 2 on the outer curve may be subjected to a shaping process beforehand, so that it is tailored optimally to the curve and/or shape of the channel body 2. However, it is also possible to use slab-shaped absorber material which is first shaped corresponding to the contour of the channel body 2 during the injection molding process.

The present invention is not restricted to the exemplary embodiments described above and illustrated in the drawing. Rather, an array of variations are conceivable, which make use of the ideas according to the present invention defined in the claims even if they have a significantly differing design. Thus, for example, it is also possible to implement the sound-absorbing component 10 with a varying thickness, particularly as wedge-shaped. It is also in the scope of the present invention to use sound-absorbing components 10, 11, 12 having a textured inner side, such as a wavy inner side or one having protrusions.

What is claimed is:

1. An air conduction element (1), for a motor vehicle, having a reverberant channel body (2) manufactured from plastic, which has at least one wall region replaced by a sound-absorbing component (10, 11, 12), the sound-absorbing component having an at least partially exposed outer side, wherein an edge region of the sound-absorbing component (10, 11, 12) is extrusion-coated with the plastic of the channel body (2) in such a way that the sound-absorbing component (10, 11, 12) is connected in a form-fitting way to the channel body (2) along at least a section of its circumference.

2. The air conduction element according to claim 1, wherein the sound-absorbing component (10, 11, 12) is connected in a form-fitting way to the channel body (2) along its entire circumference.

3. The air conduction element according to claim 1, wherein the sound-absorbing component (10, 11, 12) is produced from a porous, air-permeable layer (15) made of sound-absorbing material.

4. The air conduction element according to claim 1, wherein the sound-absorbing component (10, 11, 12) is produced from an air-permeable layer (15) made of polyethylene terephthalate.

5. The air conduction element according to claim 3, wherein the air-permeable layer (15) of the sound-absorbing component is provided with a carrying nonwoven (16) and a covering nonwoven (17).

6. The air conduction element according to claim 1, wherein the sound-absorbing component (11) is provided on the outside with a film (18) which is impermeable to air.

7. The air conduction element according to claim 1, wherein the sound-absorbing component (10, 11, 12) is provided on the outside with a microperforated film.

8. The air conduction element according to claim 1, wherein the sound-absorbing component (10) is implemented as a curved molded part.

9. The air conduction element according to claim 1, wherein the channel body (2) is implemented as a one-piece hollow body.

10. The air conduction element according to claim 1, wherein the channel body (2) and the sound-absorbing component (10, 11, 12) are each produced from polyethylene terephthalate.

11. The air conduction element according to claim 1, wherein the channel body (2), the sound absorbing component (10, 11, 12) and a film (18) positioned on the outside of the sound-absorbing component are each produced from polyethylene terephthalate.

12. The air conduction element according to claim 3, wherein the air-permeable layer (15) of the sound-absorbing component is provided with a carrying nonwoven (16) or a covering nonwoven (17).

* * * * *